US009930556B2

(12) United States Patent
Gao et al.

(10) Patent No.: US 9,930,556 B2
(45) Date of Patent: Mar. 27, 2018

(54) METHOD FOR DETECTING COVERAGE OF TARGET NETWORK, AND APPARATUS

(71) Applicant: Huawei Device Co., Ltd., Shenzhen (CN)

(72) Inventors: Linyi Gao, Beijing (CN); Guodong Xue, Shenzhen (CN); Qiang Yi, Beijing (CN); Hui Jin, Beijing (CN)

(73) Assignee: Nokia Technologies Oy, Espoo (FI)

( * ) Notice: Subject to any disclaimer, the term of this patent is extended or adjusted under 35 U.S.C. 154(b) by 146 days.

(21) Appl. No.: 14/959,332

(22) Filed: Dec. 4, 2015

(65) Prior Publication Data
US 2016/0088507 A1 Mar. 24, 2016

Related U.S. Application Data

(63) Continuation of application No. PCT/CN2014/078588, filed on May 28, 2014.

(30) Foreign Application Priority Data

Jun. 5, 2013 (CN) .......................... 2013 1 0222212

(51) Int. Cl.
*H04W 24/10* (2009.01)
*H04W 36/00* (2009.01)
*H04W 72/04* (2009.01)

(52) U.S. Cl.
CPC ....... *H04W 24/10* (2013.01); *H04W 36/0083* (2013.01); *H04W 72/0453* (2013.01)

(58) Field of Classification Search
CPC .............................. H04W 24/00; H04L 43/50
See application file for complete search history.

(56) References Cited

U.S. PATENT DOCUMENTS 8,593,990 B1 * 11/2013 Henttonen ........ H04W 36/0083
370/252
2009/0191857 A1 7/2009 Horn et al.
(Continued)

FOREIGN PATENT DOCUMENTS

CN 101370198 A 2/2009
CN 101790173 A 7/2010
(Continued)

OTHER PUBLICATIONS

Machine Translation and Abstract of Chinese Publication No. CN102014406, Apr. 13, 2011, 9 pages.
(Continued)

*Primary Examiner* — Zhiren Qin

(57) ABSTRACT

A method for detecting coverage of a target network, including acquiring a list of carrier frequencies of a target network that covers a position of an embedded universal integrated circuit card (eUICC) terminal; sending, to the eUICC terminal, a frequency measurement request that carries the list of carrier frequencies, so that the eUICC terminal performs frequency measurement for each carrier frequency in the list of carrier frequencies; and receiving a frequency measurement report reported by the eUICC terminal. A corresponding apparatus, including a subscription management entity, a network device, and an eUICC terminal. According to the technical solutions of the present disclosure, a coverage status of a target network to be switched to can be detected before switching.

15 Claims, 6 Drawing Sheets

(56) References Cited

U.S. PATENT DOCUMENTS

| | | | |
|---|---|---|---|
| 2010/0106967 A1 | 4/2010 | Johnsson et al. | |
| 2012/0264439 A1 | 10/2012 | Jorguseski et al. | |
| 2013/0344864 A1* | 12/2013 | Park | H04W 8/18 455/432.3 |
| 2014/0134981 A1 | 5/2014 | Park et al. | |
| 2014/0359278 A1 | 12/2014 | Meyerstein et al. | |
| 2016/0174088 A1* | 6/2016 | Yilmaz | H04W 36/0088 455/434 |

FOREIGN PATENT DOCUMENTS

| | | |
|---|---|---|
| CN | 102014406 A | 4/2011 |
| CN | 102204299 A | 9/2011 |
| CN | 102342140 A | 2/2012 |
| CN | 102917425 A | 2/2013 |
| CN | 102960015 A | 3/2013 |
| WO | 2013009044 A2 | 1/2013 |
| WO | 2013036010 A1 | 3/2013 |

OTHER PUBLICATIONS

Foreign Communication From a Counterpart Application, Chinese Application No. 201310222212.X, Chinese Office Action dated Apr. 20, 2017, 6 pages.

Partial English Translation and Abstract of Chinese Patent Application No. CN101370198, Mar. 21, 2016, 4 pages.

Partial English Translation and Abstract of Chinese Patent Application No. CN101790173, Mar. 12, 2016, 5 pages.

Zhimin D. et al., "Smart Cards; Embedded UICC and its Remote Management Technology," Qualcomm Wireless Comm. Technology (China) Limited, Beijing, Apr. 2012, pp. 48-51.

"Smart Cards; Embedded UICC; Requirements Specification; Release 12," ETSI TS 103 383, V12.0.0, Feb. 2013, 19 pages.

Foreign Communication From a Counterpart Application, PCT Application No. PCT/CN2014/078588, English Translation of International Search Report dated Aug. 26, 2014, 3 pages.

Foreign Communication From a Counterpart Application, PCT Application No. PCT/CN2014/078588, English Translation of Written Opinion dated Aug. 26, 2014, 6 pages.

"Embedded SIM Task Force Requirements and Use Cases," GSM Association, 1.0, Feb. 21, 2011, 38 pages.

Ericsson, "GSM OSS-RC 5 Radio Network Optimization (RNO)," Retrieved from the Internet: URL:http://www.ericsson.com/res/ourportfolio/pdf/ericsson-academy/courses/Courseflow_OSS_RC5.pdf [retrieved on Jul. 21, 2011], Jan. 2008, 360 pages.

Foreign Communication From a Counterpart Application, European Application No. 14808352.0, Partial Supplementary European Search Report dated Apr. 20, 2016, 8 pages.

* cited by examiner

METHOD FOR DETECTING COVERAGE OF TARGET NETWORK, AND APPARATUS

CROSS-REFERENCE TO RELATED APPLICATIONS

This application is a continuation of International Application No. PCT/CN2014/078588, filed on May 28, 2014, which claims priority to Chinese Patent Application No. 201310222212.X, filed on Jun. 5, 2013, both of which are hereby incorporated by reference in their entireties.

TECHNICAL FIELD

The present disclosure relates to the field of communications technologies, and in particular, to a method for detecting coverage of a target network, and an apparatus.

BACKGROUND

A conventional universal integrated circuit card (UICC) is customized by an operator, and includes information related to the operator at delivery; therefore, only the corresponding operator can be connected by using the UICC. An embedded UICC (eUICC) is a UICC embedded in a terminal device, and can be remotely managed by a network side, for example, downloading of mobile operator data, and switching or accessing of a mobile operator network; therefore, different operator networks can be accessed by using the eUICC.

In the prior art, such a scenario is proposed: a Machine to Machine (M2M) service provider (SP) enters into a contract with a mobile network operator (MNO), and the MNO provides a service to a batch of eUICC terminals of the SP; and after the contract expires, the SP selects to enter into a contract with another MNO. It is hoped that such switching can be automatically completed in a relatively short given time.

Because network coverage statuses of different MNOs are different, a network of an MNO after switching may not completely cover all the eUICC terminal devices that are subscribed with the MNO, of the SP. To ensure continuity of a service of the SP, a coverage status of a target network to be switched to needs to be detected before switching.

SUMMARY

Embodiments of the present disclosure provide a method for detecting coverage of a target network, and an apparatus, so as to detect a coverage status of the target network before network switching.

A first aspect of the present disclosure provides a method for detecting coverage of a target network, including acquiring a list of carrier frequencies of a target network that covers a position of an embedded universal integrated circuit card eUICC terminal; sending, to the eUICC terminal, a frequency measurement request that carries the list of carrier frequencies, so that the eUICC terminal performs frequency measurement for each carrier frequency in the list of carrier frequencies; and receiving a frequency measurement report reported by the eUICC terminal.

A second aspect of the present disclosure provides a method for detecting coverage of a target network, including acquiring information that is needed when an eUICC terminal establishes a temporary connection to a target network, and generating a test file including the information; and sending the test file to the eUICC terminal, so that the eUICC terminal establishes the temporary connection to the target network according to the test file.

A third aspect of the present disclosure provides a method for detecting coverage of a target network, including sending a detection request to a first subscription management entity, to instruct the first subscription management entity to generate a test file for an eUICC terminal; establishing a temporary connection to the eUICC terminal by using the test file; and testing coverage of a target network at a position of the eUICC terminal.

A fourth aspect of the present disclosure provides a method for detecting coverage of a target network, including receiving a test file sent by a subscription management entity; establishing a temporary connection to a target network by using the test file; and testing coverage of a target network at a position of an eUICC terminal.

A fifth aspect of the present disclosure provides a subscription management device, including an acquiring module configured to acquire a list of carrier frequencies of a target network that covers a position of an eUICC terminal; a generating module configured to generate a frequency measurement request that carries the list of carrier frequencies; a sending module configured to send the frequency measurement request to the eUICC terminal, so that the eUICC terminal performs frequency measurement for each carrier frequency in the list of carrier frequencies; and a receiving module configured to receive a frequency measurement report reported by the eUICC terminal.

A sixth aspect of the present disclosure provides a subscription management device, including an acquiring module configured to acquire information that is needed when an eUICC terminal establishes a temporary connection to a target network; a generating module configured to generate a test file including the information; and a sending module configured to send the test file to the eUICC terminal, so that the eUICC terminal establishes the temporary connection to the target network according to the test file.

A seventh aspect of the present disclosure provides a network device, including a sending module configured to send a detection request to a first subscription management entity, to instruct the first subscription management entity to generate a test file for an eUICC terminal; a connection module configured to establish a temporary connection to the eUICC terminal by using the test file; and a testing module configured to test coverage of a target network at a position of the eUICC terminal.

An eighth aspect of the present disclosure provides an eUICC terminal, including a receiving module configured to receive a test file sent by a subscription management entity; a connection module configured to establish a temporary connection to a target network by using the test file; and a testing module configured to test coverage of the target network at a position of the eUICC terminal.

According to the embodiments of the present disclosure, the technical solutions in which a subscription management entity sends a frequency measurement request, to instruct an eUICC terminal that accesses a current network to perform frequency measurement for a coverage status of a target network, so as to acquire a frequency measurement report are used, so that a coverage status of a target network to be switched to can be detected before switching.

DETAILED DESCRIPTION

To make the objectives, technical solutions, and advantages of the embodiments of the present disclosure clearer, the following clearly and describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Technologies described in this specification may be applied to various communications systems, for example, current Second Generation (2G) and Third Generation (3G) communications systems and a next-generation communications system, for example, a Global System for Mobile Communications (GSM), a Code Division Multiple Access (CDMA) system, a Time Division Multiple Access (TDMA) system, Wideband Code Division Multiple Access (WCDMA), a Frequency Division Multiple Access (FDMA) system, an Orthogonal Frequency-Division Multiple Access (OFDMA) system, a single-carrier FDMA (SC-FDMA) system, a general packet radio service (GPRS) system, a Long Term Evolution (LTE) system, and other communications systems.

Embodiment 1

Figure 1:
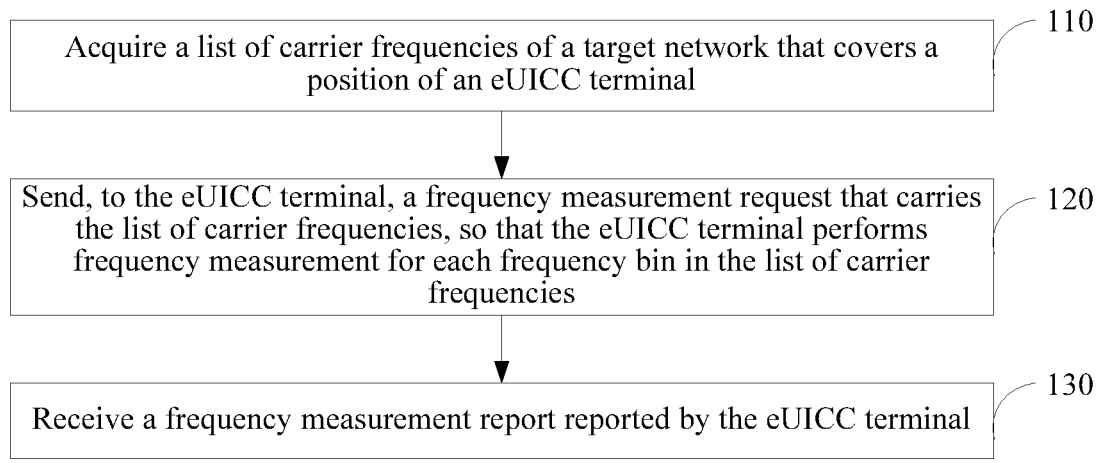
FIG. 1 is a flowchart of a method for detecting coverage of a target network according to an embodiment of the present disclosure.

Referring to FIG. 1, this embodiment of the present disclosure provides a method for detecting coverage of a target network. The method includes the following steps.

110: Acquire a list of carrier frequencies of a target network that covers a position of an eUICC terminal.

It is assumed that an SP enters into a contract with an MNO A, and currently, the MNO A provides a service to a batch of eUICC terminals of the SP; and when a negotiated service time almost expires, the SP requests an MNO B to provide a service to the SP, so that network switching is performed when the service time expires, that is, a mobile network operator is switched from the MNO A to the MNO B in the negotiated time. The MNO A is a current network in which the eUICC terminals are located, and is referred to as a current network for short; and the MNO B is a target network to be switched to, and is referred to as a target network for short.

The method in this embodiment of the present disclosure is performed by a subscription management entity (SM), where the subscription management entity is a device for managing a file in an eUICC. The eUICC includes two types of files: a provisioning profile (PP), where the eUICC may access the SM by using the file, and an operational profile (OP), where the eUICC may access an operator network by using the file, for example, the current network or the target network. In this embodiment, an SM used by the target network (the MNO B) is referred to as a first subscription management entity (an SM B), and an SM used by the current network (the MNO A) is referred to as a second subscription management entity (an SM A).

The first subscription management entity (the SM B) may acquire, by receiving a detection request sent by the target network, the list of carrier frequencies of the target network that covers the position of the eUICC terminal, and some other necessary information.

In a specific application, before network switching is performed, the SP first sends a request for detecting coverage of the target network to the target network, where some necessary information is carried in the request for detecting the coverage of the target network to inform the target network, so as to require the target network to detect a coverage status of the target network at the position of the eUICC terminal.

The target network acquires the necessary information from the service provider, which includes information about the position of the eUICC terminal, and an identifier of an eUICC in the eUICC terminal, such as an electronic identifier (eID), or may further include information about the current network in which the eUICC terminal is located, or information about the second subscription management entity (the SM A) used by the current network. The target network may search, according to the information about the current network, for the information about the subscription management entity used by the current network. The target network may search for a frequency configuration of the target network according to the position of the eUICC terminal, to determine a list of carrier frequencies that need to be measured. It should be noted that, the list of carrier frequencies is a list of carrier frequencies that need to be measured by the target network and is unrelated with the current network.

After receiving the request for detecting the coverage of the target network, the target network sends the detection request to the first subscription management entity. Generally, the detection request carries at least the following necessary information: the list of carrier frequencies and the identifier of the eUICC embedded in the eUICC terminal, or may further carry the information about the second subscription management entity. The detection request may further carry an indication (cause) to indicate that frequency measurement needs to be performed.

120: Send, to the eUICC terminal, a frequency measurement request that carries the list of carrier frequencies, so that the eUICC terminal performs frequency measurement for each carrier frequency in the list of carrier frequencies.

In an implementation manner, the current network and the target network use different subscription management entities separately; in this case, the SM B and the SM A are different devices that are independent of each other. After receiving the detection request, the first subscription management entity (SM B) first generates a frequency measurement request, and then sends the frequency measurement request to the SM A according to the learned information about the second subscription management entity (SM A), where the frequency measurement request sent to the SM A needs to carry the identifier of the eUICC and the list of carrier frequencies. Then, the SM A sends, to the eUICC terminal according to the identifier of the eUICC, the frequency measurement request that carries the list of carrier frequencies, so that after receiving the frequency measurement request, the eUICC terminal may perform frequency measurement according to the obtained list of carrier frequencies.

In an actual application, the SM A may send the frequency measurement request to the eUICC terminal by using the current network, or may send the frequency measurement request to the eUICC terminal by using a dedicated network.

In an actual application, mutual authentication may be performed between the SM A and the SM B. The foregoing operation of sending the frequency measurement request is performed only after the authentication succeeds.

In another implementation manner, the current network and the target network may share a subscription management entity; in this case, the SM B and SM A may be a same subscription management entity. Therefore, after the first subscription management entity (the SM B) receives the detection request, and generates the frequency measurement request, the first subscription management entity (the SM B) directly sends, to the eUICC terminal according to the identifier of the eUICC, the frequency measurement request that carries the list of carrier frequencies, so that after receiving the frequency measurement request, the eUICC terminal may perform frequency measurement according to the obtained list of carrier frequencies.

130: Receive a frequency measurement report reported by the eUICC terminal.

After the eUICC terminal receives the frequency measurement request, the eUICC in the eUICC terminal selects a suitable frequency measurement time according to a policy control function (PCF) policy, for example, in a time in which there is no data transmission between the eUICC terminal and the MNO A, the eUICC terminal is instructed to perform frequency measurement for each carrier frequency in the list of carrier frequencies, where measurement content includes at least measurement of signal strength of each carrier frequency in the list of carrier frequencies.

After finishing the measurement, the eUICC terminal generates a frequency measurement report that includes at least the signal strength of each carrier frequency in the list of carrier frequencies, where the frequency measurement report is sent by the eUICC to the SM B by using the SM A. At this point, the coverage status of the target network at the position of the eUICC terminal is already detected before switching.

The SM B may further forward the frequency measurement report to the MNO B, so that the MNO B performs corresponding processing according to the obtained frequency measurement report, which includes determining, according to the signal strength of each carrier frequency in the list of carrier frequencies, whether the target network at the position of the eUICC terminal needs to be optimized, for example, when signal strength of several carrier frequencies in the list of carrier frequencies does not exceed a threshold, network optimization must be performed. After the network optimization, the MNO B may re-determine a list of carrier frequencies that need to be detected, and then the foregoing step 110 to step 130 are repeatedly performed, to detect the coverage status of the target network again. The MNO B may further send the obtained frequency measurement report to the SP.

This embodiment of the present disclosure provides a method for detecting coverage of a target network above. In the method, a first subscription management entity used by a target network sends a list of carrier frequencies of the target network at a position of an eUICC terminal to the eUICC terminal by using a second subscription management entity used by a current network in which the eUICC terminal is located, and the eUICC terminal reports a frequency measurement report after detecting signal strength of each carrier frequency in the list of carrier frequencies. In the method, the target network establishes no communication connection to the eUICC terminal, and therefore, the solution may be referred to as an offline testing solution. By using such an offline testing solution, a coverage status of a target network to be switched to can be detected conveniently and easily before network switching.

Embodiment 2

Figure 2:
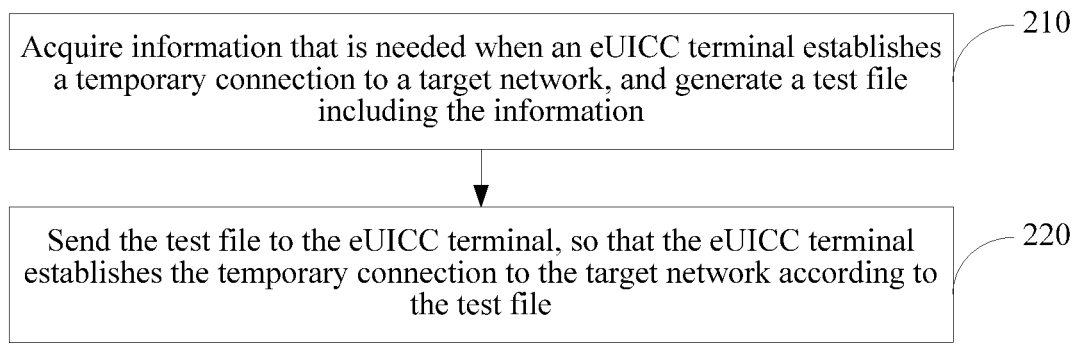
FIG. 2 is a flowchart of a method for detecting coverage of a target network according to another embodiment of the present disclosure.

Referring to FIG. 2, this embodiment of the present disclosure provides another method for detecting coverage of a target network. The method includes the following steps.

210: Acquire information that is needed when an eUICC terminal establishes a temporary connection to a target network, and generate a test file including the information.

It is assumed that an SP enters into a contract with an MNO A, and currently, the MNO A provides a service to a batch of eUICC terminals of the SP; and when a negotiated service time almost expires, the SP requests an MNO B to provide a service to the SP, so that network switching is performed when the service time expires, that is, a mobile network operator is switched from the MNO A to the MNO B in the negotiated time. The MNO A is a current network in which the eUICC terminals are located, and is referred to as a current network for short; and the MNO B is a target network to be switched to, and is referred to as a target network for short.

The method in this embodiment of the present disclosure is performed by a subscription management entity, where the subscription management entity is a device for managing a file in an eUICC. The eUICC includes two types of files: a PP, where the eUICC may access the SM by using the file, and an OP, where the eUICC may access an operator network by using the file, for example, the current network or the target network. In this embodiment, an SM used by the target network is referred to as a first subscription management entity (an SM B), and an SM used by the current network is referred to as a second subscription management entity (an SM A).

Before network switching is performed, the SP first sends a request for detecting coverage of the target network to the target network, where some necessary information is carried in the request for detecting the coverage of the target network to inform the target network, so as to require the target network to detect a coverage status of the target network at the position of the eUICC terminal.

The target network acquires the necessary information from the service provider, which includes an identifier of an eUICC in the eUICC terminal, such as an eID, and information about the current network in which the eUICC terminal is located, or information about the second subscription management entity used by the current network. The target network may search, according to the information about the current network, for the information about the subscription management entity used by the current network.

After acquiring the foregoing necessary information from the SP, the target network (the MNO B) sends a detection request to the first subscription management entity (the SM B) used by the MNO B, to instruct the SM B to generate a test file, where the detection request includes information that is needed when the eUICC terminal establishes a temporary connection to the target network, and may further include an indication indicating that the SM B is required to test the coverage status of the target network.

After receiving the detection request, the SM B generates a test file for the eUICC terminal. The test file includes at least the information that is needed when the eUICC terminal establishes the temporary connection to the target network, so that the eUICC terminal establishes the temporary connection to the target network.

The information that is needed when the eUICC terminal establishes the temporary connection to the target network includes at least: an international mobile subscriber identity (IMSI) allocated by the target network to the eUICC terminal, and an authentication key (K/Ki), and optionally, may further include an authentication algorithm, an encryption key generation algorithm, a user name and a password used when the eUICC accesses a network, or the like.

The test file is similar to the OP described above, and may be considered as a temporary OP, where duration of validity may be set for information in the test file. After receiving the foregoing information such as the IMSI and the K/Ki, the SM B constructs a file according to a specified file format, where the constructed file includes the information such as the IMSI and the K/Ki, so as to generate the test file.

220: Send the test file to the eUICC terminal, so that the eUICC terminal establishes the temporary connection to the target network according to the test file.

In an implementation manner, the current network and the target network use different subscription management entities separately; in this case, the SM B and the SM A are different devices that are independent of each other. The first subscription management entity (the SM B) may send the generated test file to the SM A according to the learned information about the second subscription management entity (the SM A), and the SM A sends the test file to the eUICC terminal according to the identifier of the eUICC. The indication indicating that the eUICC terminal is required to detect the coverage of the network may be carried in the test file and sent to the eUICC terminal, or may be sent separately.

In some other implementation manners, before sending the test file, the SM B may first receive a profile installer credential sent by the SM A, encrypt the test file by using the profile installer credential, and then send the encrypted test file to the eUICC terminal by using the SM A, so as to improve security.

In an actual application, mutual authentication may be performed between the SM A and the SM B. The foregoing operation of sending the test file is performed only after the authentication succeeds.

In another implementation manner, the current network and the target network may share a subscription management entity; in this case, the SM B and SM A are a same subscription management entity. Therefore, the SM B may directly send, after encrypting the generated test file by using the profile installer credential, the encrypted test file to the eUICC terminal.

After receiving the test file, the eUICC may select a suitable time according to a PCF policy, to activate a current OP (where an operator network can be accessed by using the file) and activate the test file, so as to establish the temporary connection to MNO B. The temporary connection may be selected to be established in a time period in which there is no data transmission between the eUICC terminal and the MNO A; in this case, a network connection between the eUICC terminal and the MNO A is temporarily ended. For the foregoing process in which the temporary connection is established after the current OP is activated and the test file is activated, reference may be made to the prior art, and details are not provided herein again.

After the target network successfully establishes the temporary connection to the eUICC terminal, the coverage of the target network may be tested as needed, content of the testing may include testing of signal strength and quality, testing of a data transmission rate, or the like, for example, the eUICC terminal tests signal strength of each carrier frequency according to a list of carrier frequencies that is acquired from the target network, and returns a testing report to the target network.

The target network ends the temporary connection to the eUICC terminal after the testing is finished or after a specified time is reached, so that the eUICC terminal re-accesses the current network.

The method in this embodiment of the present disclosure is described in detail above by using the first subscription management entity as an execution body. The method in this embodiment of the present disclosure is further described in detail below by using the target network as the execution body.

Figure 3:
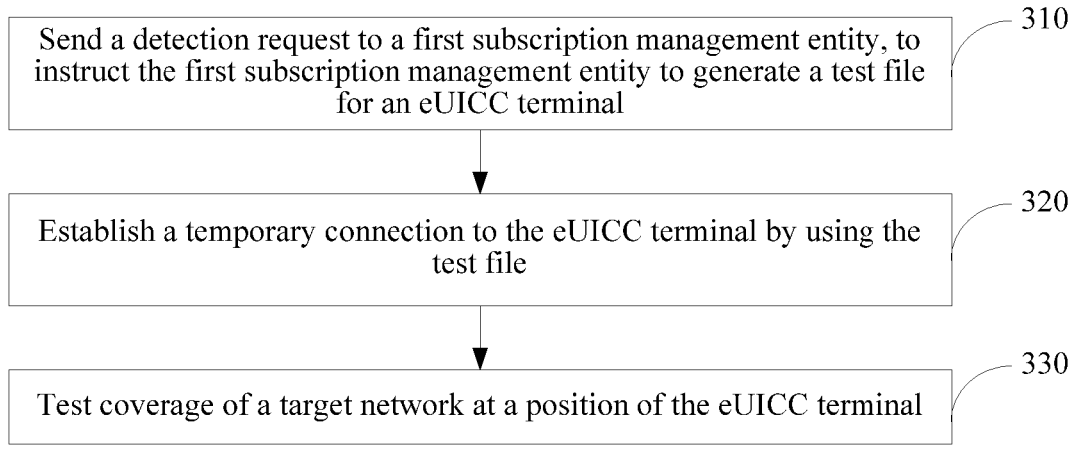
FIG. 3 is a flowchart of a method for detecting coverage of a target network according to still another embodiment of the present disclosure.

Referring to FIG. 3, this embodiment of the present disclosure provides another method for detecting coverage of a target network. The method includes the following steps.

310: Send a detection request to a first subscription management entity, to instruct the first subscription management entity to generate a test file for an eUICC terminal.

In this step, a target network instructs the first subscription management entity to generate the test file for the eUICC terminal, and for details, refer to the embodiment shown in FIG. 2.

320: Establish a temporary connection to the eUICC terminal by using the test file.

The test file received by the eUICC terminal includes information that is needed for establishing the temporary connection to the target network, and the eUICC terminal may establish the temporary connection to the target network according to the test file. For details, refer to the embodiment shown in FIG. 2.

330: After the temporary connection is successfully established, test coverage of a target network at a position of the eUICC terminal.

After the target network successfully establishes the temporary connection to the eUICC terminal, the coverage of the target network may be tested as needed, content of the testing may include testing of signal strength and quality, testing of a data transmission rate, or the like, for example, the eUICC terminal tests signal strength of each carrier frequency according to a list of carrier frequencies that is acquired from the target network, and returns a testing report to the target network.

The target network ends the temporary connection to the eUICC terminal after the testing is finished or after a specified time is reached, so that the eUICC terminal re-accesses a current network.

In an implementation manner, after receiving the test file, an eUICC may generate a testing timer according to a policy, and send a count value of the timer to an MNO B. The policy is used to specify a method and an occasion for generating the timer. The count value may be also sent to an SM A and then sent to the MNO B by an SM B. The MNO B may end the temporary connection to the eUICC terminal when the count value reported by the eUICC terminal is received and a time of the count value is reached. If the testing is not completed in the time of the timer, the MNO B may send a request for continuing a test to the eUICC terminal, and the eUICC terminal determines to reestablish the temporary connection at a suitable time, to continue to test the coverage of the target network. After the temporary connection is ended, the eUICC terminal may activate an OP, and reestablish a connection to the MNO A, to restore a previous service.

In an implementation manner, if the MNO B does not successfully establish the temporary connection to the eUICC terminal, the eUICC terminal may report a connection establishment failure message to the MNO B, where the connection establishment failure message carries an indication used for indicating a reason why the establishment of the connection fails, and the eUICC terminal reestablishes the connection to the MNO A, to restore the service before. After the MNO B receives the connection establishment failure message that is reported by the eUICC terminal, the MNO B may acquire the indication used for indicating the reason why the establishment of the connection fails and carried in the connection establishment failure message, and perform network optimization according to the indication. After the network optimization, the foregoing step 310 to step 330 may be repeatedly performed, to detect a coverage status of the target network again.

Figure 4:
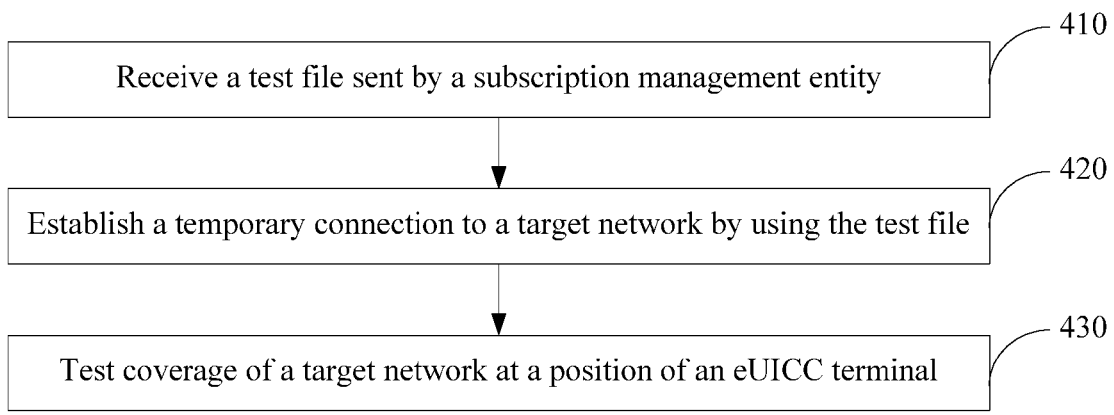
FIG. 4 is a flowchart of a method for detecting coverage of a target network according to yet another embodiment of the present disclosure.

The method in this embodiment of the present disclosure is further described in detail below by using the eUICC terminal as the execution body. Referring to FIG. 4, this embodiment of the present disclosure provides another method for detecting coverage of a target network. The method includes the following steps.

410: Receive a test file sent by a subscription management entity.

420: Establish a temporary connection to a target network by using the test file.

430: Test coverage of a target network at a position of an eUICC terminal. The testing is performed according to an indication or a request of the target network.

Optionally, the method further includes, after the establishment of the temporary connection fails, reporting a connection establishment failure message to the target network.

Optionally, after the receiving a test file sent by a subscription management entity, the method further includes activating the test file according to a policy, generating a timer, and sending a count value of the timer to the target network, to instruct the target network to end, when a time of the count value is reached, the temporary connection.

For more details, refer to the embodiments shown in FIG. 2 and FIG. 3.

This embodiment of the present disclosure provides a method for detecting coverage of a target network above, and describes the method separately from perspectives of a subscription management entity, a target network, and an eUICC terminal. In the method, a first subscription management entity sends a test file to an eUICC terminal by using a second subscription management entity used by a current network in which the eUICC terminal is located, so that the eUICC terminal establishes a temporary connection to the target network according to the test file, and coverage of the target network can be tested online, where the solution may be referred to as an online testing solution. By using such an online testing solution, a coverage status of a target network to be switched to can be detected conveniently and easily before network switching.

Embodiment 3

Figure 5:
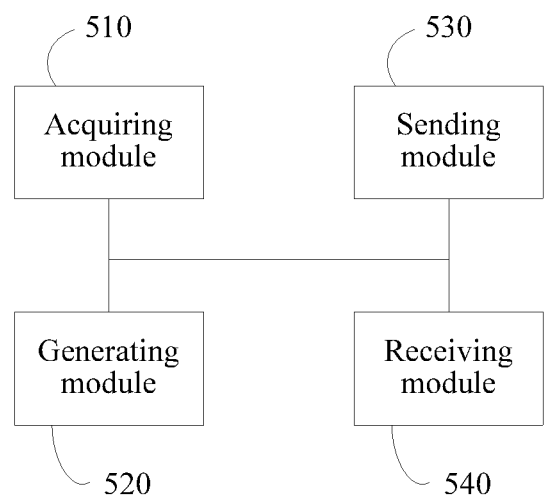
FIG. 5 is a schematic diagram of a subscription management entity according to an embodiment of the present disclosure.

Referring to FIG. 5, this embodiment of the present disclosure provides a subscription management entity, including an acquiring module 510 configured to acquire a list of carrier frequencies of a target network that covers a position of an eUICC terminal; a generating module 520 configured to generate a frequency measurement request that carries the list of carrier frequencies; a sending module 530 configured to send the frequency measurement request to the eUICC terminal, so that the eUICC terminal performs frequency measurement for each carrier frequency in the list of carrier frequencies; and a receiving module 540 configured to receive a frequency measurement report reported by the eUICC terminal.

The frequency measurement report may include at least signal strength, which is obtained through measurement by the eUICC terminal, of each carrier frequency in the list of carrier frequencies.

The sending module 530 may be configured to directly send the frequency measurement request to the eUICC terminal, or send the frequency measurement request to the eUICC terminal by using a second subscription management entity.

Optionally, the acquiring module 510 may be configured to receive a detection request sent by the target network, where the detection request carries the list of carrier frequencies and an identifier of an eUICC in the eUICC terminal, or may further carry information about the second subscription management entity.

Optionally, the sending module 530 may be further configured to send the frequency measurement report to the target network, where the frequency measurement report carries the signal strength of each carrier frequency in the list of carrier frequencies, so that the target network determines, according to the signal strength of each carrier frequency, whether network optimization needs be performed.

The subscription management entity provided in this embodiment of the present disclosure is described above, and for a more specific description, refer to the embodiment shown in FIG. 1. The subscription management entity described in this embodiment may be the first subscription management entity described in the embodiment in FIG. 1, that is, the SM B.

The subscription management entity provided in this embodiment of the present disclosure may send a list of carrier frequencies of a target network at a position of an eUICC terminal to the eUICC terminal by using a second subscription management entity used by a current network in which the eUICC terminal is located, and the eUICC terminal reports a frequency measurement report after performing frequency measurement, so that a coverage status of a target network to be switched to can be detected conveniently and easily before network switching.

Embodiment 4

Figure 6:
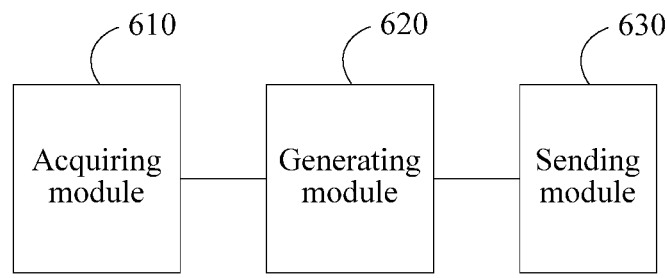
FIG. 6 is a schematic diagram of a subscription management entity according to another embodiment of the present disclosure.

Referring to FIG. 6, this embodiment of the present disclosure provides a subscription management entity, including an acquiring module 610 configured to acquire information that is needed when an eUICC terminal establishes a temporary connection to a target network; a generating module 620 configured to generate a test file including the information for the eUICC terminal; and a sending module 630 configured to send the test file to the eUICC terminal, so that the eUICC terminal establishes the temporary connection to the target network according to the test file.

The sending module 630 may be configured to directly send the frequency measurement request to the eUICC terminal, or send the frequency measurement request to the eUICC terminal by using a second subscription management entity.

Optionally, the subscription management entity may further include a receiving module configured to receive a detection request sent by the target network, where the detection request carries an identifier of an eUICC in the eUICC terminal, or may further carry information about the second subscription management entity.

Optionally, the receiving module may be further configured to receive a profile installer credential sent by the second subscription management entity; and the subscription management entity may further include an encryption module configured to encrypt the test file by using the profile installer credential.

The subscription management entity provided in this embodiment of the present disclosure is described above, and for a more specific description, refer to the embodiments shown in FIG. 2 and FIG. 3. The subscription management unit described in this embodiment may be the SM B in the embodiments shown in FIG. 2 and FIG. 3.

The subscription management entity provided in this embodiment of the present disclosure may send a test file to an eUICC terminal by using a second subscription management entity used by a current network in which the eUICC terminal is located, so that a target network establishes a temporary connection to an eUICC terminal, and coverage of the target network is tested online, so that a coverage status of a target network to be switched to can be detected conveniently and easily before network switching.

Embodiment 5

Figure 7:
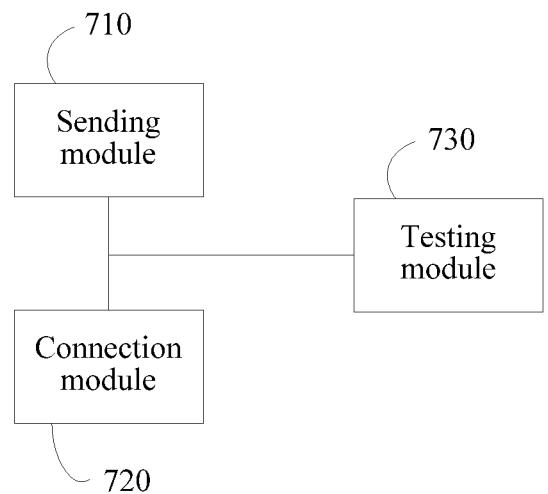
FIG. 7 is a schematic diagram of a network device according to an embodiment of the present disclosure.

Referring to FIG. 7, this embodiment of the present disclosure provides a network device, including a sending module 710 configured to send a detection request to a first subscription management entity, to instruct the first subscription management entity to generate a test file for an eUICC terminal; a connection module 720 configured to establish a temporary connection to the eUICC terminal by using the test file; and a testing module 730 configured to, after the temporary connection is successfully established, test coverage of a target network at a position of the eUICC terminal.

Optionally, the connection module may be further configured to end the temporary connection to the eUICC terminal after the testing is finished or after a specified time is reached.

Optionally, the network device may further include a receiving module configured to: after the establishment of the temporary connection fails, receive a connection establishment failure message that is reported by the eUICC terminal; and an optimization module configured to acquire an indication used for indicating a reason why the establishment of the connection fails and carried in the connection establishment failure message, and perform network optimization according to the indication.

The network device provided in this embodiment of the present disclosure is described above, and for a more specific description, refer to the embodiments shown in FIG. 2 and FIG. 3.

The network device provided in this embodiment of the present disclosure may cooperate with the subscription management entity provided in the embodiment in FIG. 5 to make a target network establish a temporary connection to an eUICC terminal, to test coverage of the target network online, so that a coverage status of a target network to be switched to can be detected conveniently and easily before network switching.

Embodiment 6

Figure 8:
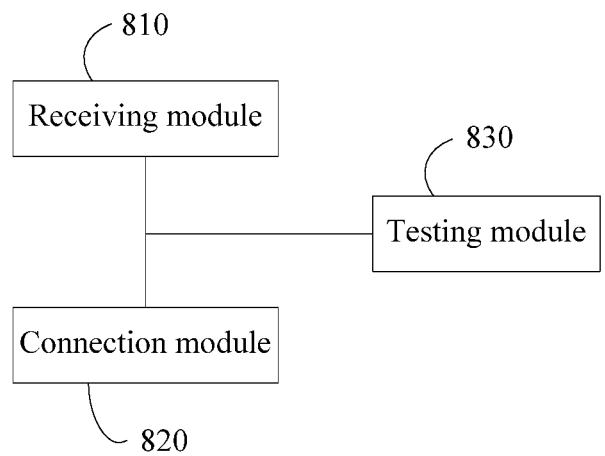
FIG. 8 is a schematic diagram of an eUICC terminal according to an embodiment of the present disclosure.

Referring to FIG. 8, this embodiment of the present disclosure provides an eUICC terminal, including a receiving module 810 configured to receive a test file sent by a subscription management entity; a connection module 820 configured to establish a temporary connection to a target network by using the test file; and a testing module 830 configured to test coverage of the target network at a position of the eUICC terminal.

Optionally, the eUICC terminal further includes a sending module configured to, after the establishment of the temporary connection fails, report a connection establishment failure message to the target network.

Optionally, the eUICC terminal further includes a timer module configured to generate a timer according to a policy, and send a count value of the timer to the target network, to instruct the target network to end, when a time of the count value is reached, the temporary connection.

The eUICC terminal provided in this embodiment of the present disclosure is described above, and for a more specific description, refer to the embodiments shown in FIG. 2, FIG. 3, and FIG. 4.

The eUICC terminal provided in this embodiment of the present disclosure can establish a temporary connection to a target network, to test coverage of the target network online, so that a coverage status of a target network to be switched to can be detected conveniently and easily before network switching.

Embodiment 7

Figure 9:
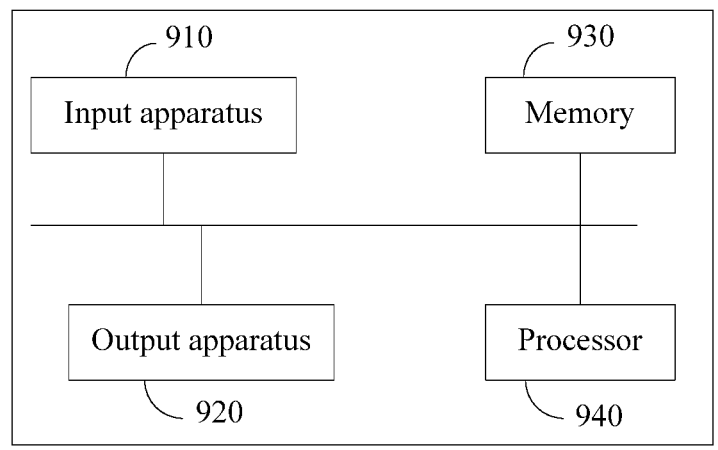
FIG. 9 is a schematic diagram of a subscription management entity according to still another embodiment of the present disclosure.

Referring to FIG. 9, this embodiment of the present disclosure provides a subscription management entity, which may include an input apparatus 910, an output apparatus 920, a memory 930, and a processor 940. In some implementation manners, the input apparatus 910, the output apparatus 920, the memory 930, and the processor 940 may be connected by using a bus or in another manner.

The processor 940 may be configured to perform the following steps: acquiring a list of carrier frequencies of a target network that covers a position of an eUICC terminal; generating a frequency measurement request that carries the list of carrier frequencies; sending the frequency measurement request to the eUICC terminal, so that the eUICC terminal performs frequency measurement for each carrier frequency in the list of carrier frequencies; and receiving a frequency measurement report reported by the eUICC terminal.

The frequency measurement report may include at least signal strength, which is obtained through measurement by the eUICC terminal, of each carrier frequency in the list of carrier frequencies.

The sending the frequency measurement request to the eUICC terminal may include directly sending the frequency measurement request to the eUICC terminal, or sending the frequency measurement request to the eUICC terminal by using a second subscription management entity.

The acquiring a list of carrier frequencies of a target network that covers a position of an eUICC terminal may include receiving a detection request sent by the target network, where the detection request carries the list of carrier frequencies and an identifier of an eUICC in the eUICC terminal, or may further carry information about the second subscription management entity.

After the receiving a frequency measurement report reported by the eUICC terminal, the following step may be further included: sending the frequency measurement report to the target network, where the frequency measurement report carries the signal strength of each carrier frequency in the list of carrier frequencies, so that the target network determines, according to the signal strength of each carrier frequency, whether network optimization needs to be performed.

The subscription management entity provided in this embodiment of the present disclosure is described above, and for a more specific description, refer to the embodiment shown in FIG. 1. The subscription management entity described in this embodiment may be the first subscription management entity described in the embodiment in FIG. 1, that is, the SM B.

The subscription management entity provided in this embodiment of the present disclosure may send a list of carrier frequencies of a target network at a position of an eUICC terminal to the eUICC terminal by using a second subscription management entity used by a current network in which the eUICC terminal is located, and the eUICC terminal reports a frequency measurement report after performing frequency measurement, so that a coverage status of a target network to be switched to can be detected conveniently and easily before network switching.

Embodiment 8

Figure 10:
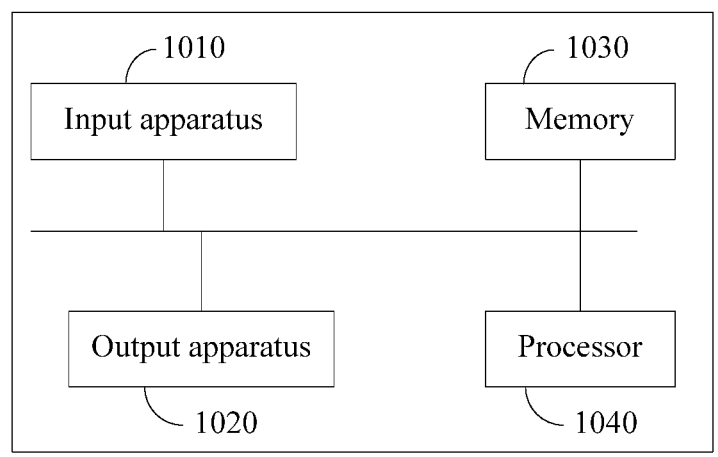
FIG. 10 is a schematic diagram of a subscription management entity according to yet another embodiment of the present disclosure.

Referring to FIG. 10, this embodiment of the present disclosure provides a subscription management entity, including an input apparatus 1010, an output apparatus 1020, a memory 1030, and a processor 1040. In some implementation manners, the input apparatus 1010, the output apparatus 1020, the memory 1030, and the processor 1040 may be connected by using a bus or in another manner.

The processor 1040 may be configured to perform the following steps: acquiring information that is needed when an eUICC terminal establishes a temporary connection to a target network, and generating a test file including the information for the eUICC terminal; and sending the test file to the eUICC terminal, so that the eUICC terminal establishes the temporary connection to the target network according to the test file.

The sending the test file to the eUICC terminal may include directly sending the test file to the eUICC terminal, or sending the test file to the eUICC terminal by using a second subscription management entity.

Before the generating a test file including the information, the following step may be further included receiving a detection request sent by the target network, where the detection request carries an identifier of an eUICC in the eUICC terminal, or may further carry information about the second subscription management entity.

Before the sending the test file to the eUICC terminal by using a second subscription management entity, the following step may be further included receiving a profile installer credential sent by the second subscription management entity; and the subscription management entity may further include an encryption module configured to encrypt the test file by using the profile installer credential.

The subscription management entity provided in this embodiment of the present disclosure is described above, and for a more specific description, refer to the embodiments shown in FIG. 2 and FIG. 3. The subscription management unit described in this embodiment may be the SM B in the embodiments shown in FIG. 2 and FIG. 3.

The subscription management entity provided in this embodiment of the present disclosure may send a test file to an eUICC terminal by using a second subscription management entity used by a current network in which the eUICC terminal is located, so that a target network establishes a temporary connection to an eUICC terminal, and coverage of the target network is tested online, so that a coverage status of a target network to be switched to can be detected conveniently and easily before network switching.

Embodiment 9

Figure 11:
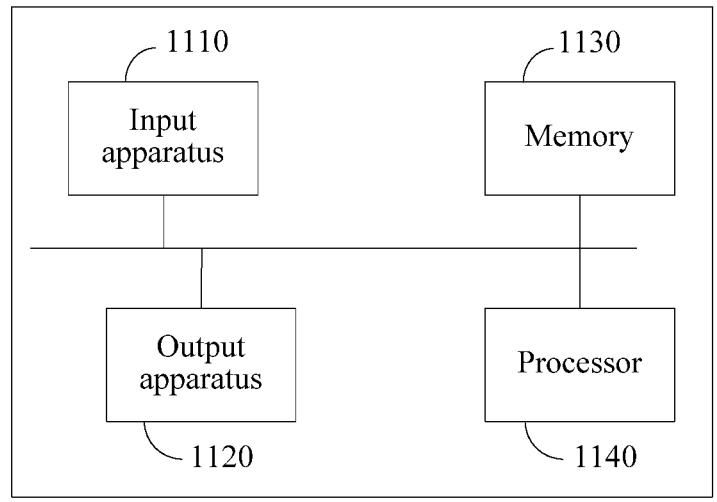
FIG. 11 is a schematic diagram of a network device according to another embodiment of the present disclosure.

Referring to FIG. 11, this embodiment of the present disclosure provides a network device, including an input apparatus 1110, an output apparatus 1120, a memory 1130, and a processor 1140. In some implementation manners, the input apparatus 1110, the output apparatus 1120, the memory 1130, and the processor 1140 may be connected by using a bus or in another manner.

The processor 1140 may be configured to perform the following steps: sending a detection request to a first subscription management entity, to instruct the first subscription management entity to generate a test file for an eUICC terminal; establishing a temporary connection to the eUICC terminal by using the test file; and after the temporary connection is successfully established, testing coverage of a target network at a position of the eUICC terminal.

After the testing coverage of a target network at a position of the eUICC terminal, the following step may be further included: ending the temporary connection to the eUICC terminal after the testing is finished or after a specified time is reached.

After the establishing a temporary connection to the eUICC terminal by using the test file, the following step may be further included: after the establishment of the temporary connection fails, receiving a connection establishment failure message that is reported by the eUICC terminal; and acquiring an indication used for indicating a reason why the establishment of the connection fails and carried in the connection establishment failure message, and performing network optimization according to the indication.

The network device provided in this embodiment of the present disclosure is described above, and for a more specific description, refer to the embodiments shown in FIG. 2 and FIG. 3.

The network device provided in this embodiment of the present disclosure may cooperate with the subscription management entity provided in the embodiment in FIG. 5 to make a target network establish a temporary connection to an eUICC terminal, to test coverage of the target network online, so that a coverage status of a target network to be switched to can be detected conveniently and easily before network switching.

Embodiment 10

Figure 12:
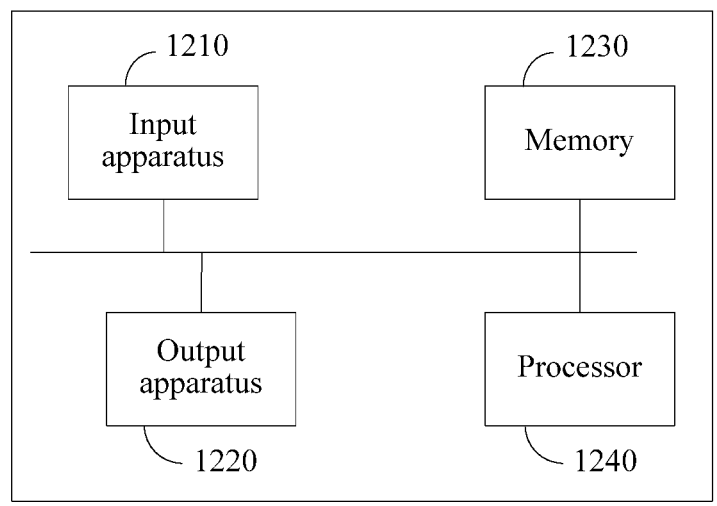
FIG. 12 is a schematic diagram of an eUICC terminal according to another embodiment of the present disclosure.

Referring to FIG. 12, this embodiment of the present disclosure provides an eUICC terminal, including an input apparatus 1210, an output apparatus 1220, a memory 1230, and a processor 1240. In some implementation manners, the input apparatus 1210, the output apparatus 1220, the memory 1230, and the processor 1240 may be connected by using a bus or in another manner.

The processor 1240 may be configured to perform the following steps: receiving a test file sent by a subscription management entity; establishing a temporary connection to a target network by using the test file; and testing coverage of a target network at a position of the eUICC terminal.

Optionally, after the establishing a temporary connection to a target network by using the test file, the following step may be further included: after the establishment of the temporary connection fails, reporting a connection establishment failure message to the target network.

After the receiving a test file sent by a subscription management entity, the following step may be further included: generating a timer according to a policy, and sending a count value of the timer to the target network, to instruct the target network to end, when a time of the count value is reached, the temporary connection.

The eUICC terminal provided in this embodiment of the present disclosure is described above, and for a more specific description, refer to the embodiments shown in FIG. 2, FIG. 3, and FIG. 4.

The eUICC terminal provided in this embodiment of the present disclosure can establish a temporary connection to a target network, to test coverage of the target network online, so that a coverage status of a target network to be switched to can be detected conveniently and easily before network switching.

It may be clearly understood by a person skilled in the art that, for the purpose of convenient and brief description, division of the foregoing functional modules is merely used as an example for description. In an actual application, the foregoing functions can be allocated to different functional modules and implemented according to a requirement, that is, the internal structure of the apparatus is divided into different functional modules to implement all or some of the functions described above. For a detailed working process of the foregoing system, apparatus, and unit, reference may be made to a corresponding process in the foregoing method embodiments, and details are not provided herein again.

In the several embodiments provided in this application, it should be understood that the disclosed system, apparatus, and method can be implemented in other manners. For example, the described apparatus embodiment is merely exemplary. For example, the module or unit division is merely logical function division and may be other division in actual implementation. For example, multiple units or components may be combined or integrated into another system, or some features may be ignored or not performed. In addition, the displayed or discussed mutual couplings or direct couplings or communication connections can be implemented by using some interfaces. The indirect couplings or communication connections between the apparatuses or units can be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit can be implemented in a form of hardware, or can be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions can be implemented in the form of a software product. The computer software product is stored in a storage medium and includes several instructions for instructing a computer device (which may be a personal computer, a server, or a network device) or a processor (processor) to perform all or some of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc.

The method for detecting coverage of a target network, and the apparatus that are provided in the embodiments of the present disclosure are described in detail above, and the description of the foregoing embodiments is only intended to help understand the method and core ideas of the present disclosure, and shall not be construed as a limitation to the present disclosure. Any variation or replacement readily figured out by a person skilled in the art within the technical scope disclosed in the present disclosure shall fall within the protection scope of the present disclosure.

What is claimed is:

1. A method for detecting coverage of a target network, comprising:
    acquiring a list of carrier frequencies of a target network that covers a position of an embedded universal integrated circuit card (eUICC) terminal;
    sending, to the eUICC terminal, a frequency measurement request that carries the list of carrier frequencies such that the eUICC terminal performs frequency measurement for each carrier frequency in the list of carrier frequencies; and
    receiving a frequency measurement report reported by the eUICC terminal,
    wherein acquiring the list of carrier frequencies of the target network that covers the position of the eUICC terminal comprises receiving, by a first subscription management entity, a detection request sent by the target network, and wherein the detection request carries the list of carrier frequencies and an identifier of an eUICC in the eUICC terminal.

2. The method according to claim 1, wherein sending, to the eUICC terminal, the frequency measurement request that carries the list of carrier frequencies comprises:
generating, by a first subscription management entity, the frequency measurement request that carries the list of carrier frequencies; and
sending the frequency measurement request to the eUICC terminal.

3. The method according to claim 2, wherein the frequency measurement request is sent to the eUICC terminal by using a second subscription management entity.

4. The method according to claim 1, wherein after receiving the frequency measurement report reported by the eUICC terminal, the method further comprises sending the frequency measurement report to the target network, wherein the frequency measurement report carries signal strength, which is obtained through measurement by the eUICC terminal, of each carrier frequency in the list of carrier frequencies such that the target network determines, according to the signal strength of each carrier frequency, whether network optimization needs to be performed.

5. A subscription management (SM) entity for detecting coverage of a target network, comprising:
a memory comprising instructions; and
a processor coupled to the memory, wherein the instructions cause the processor to be configured to:
acquire a list of carrier frequencies of a target network that covers a position of an embedded universal integrated circuit card (eUICC) terminal;
send, to the eUICC terminal, a frequency measurement request that carries the list of carrier frequencies such that the eUICC terminal performs frequency measurement for each carrier frequency in the list of carrier frequencies; and
receive a frequency measurement report reported by the eUICC terminal,
wherein the instructions cause the processor to be configured to acquire the list of carrier frequencies of the target network that covers the position of the eUICC terminal comprises the instructions causing the processor to be configured to receive, by the SM entity, a detection request sent by the target network, and
wherein the detection request carries the list of carrier frequencies and an identifier of an eUICC in the eUICC terminal.

6. The SM according to claim 5, wherein the instructions cause the processor to be configured to send, to the eUICC terminal, the frequency measurement request that carries the list of carrier frequencies comprises the instructions causing the processor to be configured to:
generate, by the SM, the frequency measurement request that carries the list of carrier frequencies; and
sending the frequency measurement request to the eUICC terminal.

7. The SM according to claim 6, wherein the frequency measurement request is sent to the eUICC terminal by using a second SM.

8. The SM according to claim 5, wherein after the instructions cause the processor to receive the frequency measurement report reported by the eUICC terminal, the instructions further cause the processor to send the frequency measurement report to the target network, wherein the frequency measurement report carries signal strength, which is obtained through measurement by the eUICC terminal, of each carrier frequency in the list of carrier frequencies such that the target network determines, according to the signal strength of each carrier frequency, whether network optimization needs to be performed.

9. A non-transitory computer readable medium having instruction stored thereon, which when executed by a processor, cause the processor to perform a method comprising:
acquiring a list of carrier frequencies of a target network that covers a position of an embedded universal integrated circuit card (eUICC) terminal;
sending, to the eUICC terminal, a frequency measurement request that carries the list of carrier frequencies such that the eUICC terminal performs frequency measurement for each carrier frequency in the list of carrier frequencies; and
receiving a frequency measurement report reported by the eUICC terminal,
wherein acquiring the list of carrier frequencies of the target network that covers the position of the eUICC terminal comprises receiving, by a first subscription management entity, a detection request sent by the target network, and
wherein the detection request carries the list of carrier frequencies and an identifier of an eUICC in the eUICC terminal.

10. The non-transitory computer readable medium according to claim 9, wherein sending, to the eUICC terminal, the frequency measurement request that carries the list of carrier frequencies comprises:
generating, by a first subscription management entity, the frequency measurement request that carries the list of carrier frequencies; and
sending the frequency measurement request to the eUICC terminal.

11. The non-transitory computer readable medium according to claim 10, wherein the frequency measurement request is sent to the eUICC terminal by using a second subscription management entity.

12. The non-transitory computer readable medium according to claim 9, wherein after receiving the frequency measurement report reported by the eUICC terminal, the method further comprises sending the frequency measurement report to the target network, wherein the frequency measurement report carries signal strength, which is obtained through measurement by the eUICC terminal, of each carrier frequency in the list of carrier frequencies such that the target network determines, according to the signal strength of each carrier frequency, whether network optimization needs to be performed.

13. A method for detecting coverage of a target network, comprising:
acquiring a list of carrier frequencies of a target network that covers a position of an embedded universal integrated circuit card (eUICC) terminal;
sending, to the eUICC terminal, a frequency measurement request that carries the list of carrier frequencies such that the eUICC terminal performs frequency measurement for each carrier frequency in the list of carrier frequencies; and
receiving a frequency measurement report reported by the eUICC terminal,
wherein after receiving the frequency measurement report reported by the eUICC terminal, the method further comprises sending the frequency measurement report to the target network, and wherein the frequency measurement report carries signal strength, which is obtained through measurement by the eUICC terminal, of each carrier frequency in the list of carrier frequencies such that the target network determines, according to the signal strength of each carrier frequency, whether network optimization needs to be performed.

14. A subscription management (SM) entity for detecting coverage of a target network, comprising:
a memory comprising instructions; and
a processor coupled to the memory, wherein the instructions cause the processor to be configured to:
acquire a list of carrier frequencies of a target network that covers a position of an embedded universal integrated circuit card (eUICC) terminal;
send, to the eUICC terminal, a frequency measurement request that carries the list of carrier frequencies such that the eUICC terminal performs frequency measurement for each carrier frequency in the list of carrier frequencies; and
receive a frequency measurement report reported by the eUICC terminal,
wherein after the instructions cause the processor to receive the frequency measurement report reported by the eUICC terminal, the instructions further cause the processor to send the frequency measurement report to the target network, and
wherein the frequency measurement report carries signal strength, which is obtained through measurement by the eUICC terminal, of each carrier frequency in the list of carrier frequencies such that the target network determines, according to the signal strength of each carrier frequency, whether network optimization needs to be performed.

15. A non-transitory computer readable medium having instruction stored thereon, which when executed by a processor, cause the processor to perform a method comprising:
acquiring a list of carrier frequencies of a target network that covers a position of an embedded universal integrated circuit card (eUICC) terminal;
sending, to the eUICC terminal, a frequency measurement request that carries the list of carrier frequencies such that the eUICC terminal performs frequency measurement for each carrier frequency in the list of carrier frequencies; and
receiving a frequency measurement report reported by the eUICC terminal,
wherein after receiving the frequency measurement report reported by the eUICC terminal, the method further comprises sending the frequency measurement report to the target network, and
wherein the frequency measurement report carries signal strength, which is obtained through measurement by the eUICC terminal, of each carrier frequency in the list of carrier frequencies such that the target network determines, according to the signal strength of each carrier frequency, whether network optimization needs to be performed.

* * * * *